(12) United States Patent
Belton et al.

(10) Patent No.: US 9,344,425 B2
(45) Date of Patent: May 17, 2016

(54) DYNAMIC OBJECT CREATION AND CERTIFICATE MANAGEMENT

(71) Applicants: Lawrence T. Belton, Charlotte, NC (US); Lynn A. Smith, Statesville, NC (US); Nathan T. Suri, Harrisburg, NC (US); Joseph R. Kaluzny, Harrisburg, NC (US); Douglas Rambo, Davidson, NC (US); Marci J. Alley, Sonoma, CA (US); Timothy H. Morris, Lexington, NC (US); Marcos Bilbao, Matthews, NC (US); Ryan Benskin, Charlotte, NC (US); Scott Hinzman, Kannapolis, NC (US)

(72) Inventors: Lawrence T. Belton, Charlotte, NC (US); Lynn A. Smith, Statesville, NC (US); Nathan T. Suri, Harrisburg, NC (US); Joseph R. Kaluzny, Harrisburg, NC (US); Douglas Rambo, Davidson, NC (US); Marci J. Alley, Sonoma, CA (US); Timothy H. Morris, Lexington, NC (US); Marcos Bilbao, Matthews, NC (US); Ryan Benskin, Charlotte, NC (US); Scott Hinzman, Kannapolis, NC (US)

(73) Assignee: WELLS FARGO BANK, N.A., Charlotte, NC (US)

(*) Notice: Subject to any disclaimer, the term of this patent is extended or adjusted under 35 U.S.C. 154(b) by 0 days.

(21) Appl. No.: 14/037,009

(22) Filed: Sep. 25, 2013

(65) Prior Publication Data
US 2015/0089232 A1 Mar. 26, 2015

(51) Int. Cl.
*H04L 9/32* (2006.01)
*H04L 29/06* (2006.01)
*G06F 21/44* (2013.01)

(52) U.S. Cl.
CPC ............ *H04L 63/0823* (2013.01); *G06F 21/44* (2013.01)

(58) Field of Classification Search
CPC ... H04L 63/0823; H04L 63/04; H04L 67/141; H04L 63/10
USPC .......................................................... 713/175
See application file for complete search history.

(56) References Cited

U.S. PATENT DOCUMENTS

| | | | |
|---|---|---|---|
| 7,395,322 B2 * | 7/2008 | Harvey et al. | 709/220 |
| 7,448,068 B2 | 11/2008 | Sun et al. | |
| 7,620,630 B2 * | 11/2009 | Lloyd | G06F 17/30067 |
| 7,730,297 B1 | 6/2010 | Pravetz | |
| 8,145,666 B2 * | 3/2012 | Bell | H04L 29/12132 707/769 |
| 8,296,563 B2 * | 10/2012 | Tu et al. | 713/156 |
| 8,307,414 B2 | 11/2012 | Zerfos et al. | |
| 8,341,401 B1 | 12/2012 | Kaufman et al. | |
| 8,392,712 B1 | 3/2013 | Wilson | |
| 2002/0152383 A1 | 10/2002 | Walsh et al. | |
| 2006/0092861 A1* | 5/2006 | Corday et al. | 370/256 |
| 2006/0190575 A1* | 8/2006 | Harvey et al. | 709/222 |
| 2007/0263577 A1 | 11/2007 | Gallo et al. | |
| 2008/0208895 A1* | 8/2008 | Rowley | H04L 29/12132 |
| 2010/0010899 A1* | 1/2010 | Lambert | G06Q 30/02 705/14.58 |

(Continued)

*Primary Examiner* — Mohammad W Reza
(74) *Attorney, Agent, or Firm* — Kegler Brown Hill & Ritter Co., L.P.A.; James Pingor

(57) ABSTRACT

Systems and methods that facilitate dynamic directory service object creation and certificate management are discussed. One such method can include discovering a device deployed on a network, creating and deploying a corresponding directory services object, automatically creating and deploying a certificate to the device and updating attributes associated with the device. The disclosed system and method reduce the time involved in deploying and configuring directory services and public key infrastructure (PKI), increase efficiency, improve network availability and lessen the chances for errors associated with manual configuration.

17 Claims, 7 Drawing Sheets

(56) References Cited

U.S. PATENT DOCUMENTS

| | | | |
|---|---|---|---|
| 2012/0216042 A1* | 8/2012 | Brown et al. | ............... 713/173 |
| 2013/0007853 A1 | 1/2013 | Gupta et al. | |
| 2013/0024921 A1 | 1/2013 | Gupta et al. | |
| 2013/0046988 A1 | 2/2013 | Saldhana | |
| 2013/0115945 A1* | 5/2013 | Holostov | ............... H04W 4/02 455/434 |

* cited by examiner

DYNAMIC OBJECT CREATION AND CERTIFICATE MANAGEMENT

BACKGROUND

Increasing demands are being placed on enterprise networks as expectations and requirements for connectivity of a wide range of devices such as tablet computers, netbooks, smart phones, multi-function devices and wireless access points continue to grow.

To facilitate ease in network management of network elements, many organizations use a directory service for domain networks. A directory service is a customizable information store that functions as a single point from which users can locate resources and services distributed throughout a network. A directory service domain controller authenticates and authorizes users, computers and other devices in a domain type network, assigning and enforcing security policies and installing or updating software.

However, even with the use of directory services to ease network management, a key obstacle faced by information technology (IT) professionals today is the sheer volume of repetitive work that needs to be done, particularly when large networked deployments are involved. As organizations seek to increase productivity and revenues through technology, they are also striving to minimize the complexity of managing a large IT infrastructure. Repetitive manual configuration is time consuming and inefficient. Complex configuration procedures involving numerous steps are error prone and make systems less secure by introducing countless opportunities for misconfiguration that can negatively impact the efficiency of the organization.

SUMMARY

The following presents a simplified summary in order to provide a basic understanding of some aspects of the innovation. This summary is not an extensive overview of the innovation. It is not intended to identify key/critical elements or to delineate the scope of the innovation. Its sole purpose is to present some concepts of the innovation in a simplified form as a prelude to the more detailed description that is presented later.

The disclosure disclosed and claimed herein, in one aspect thereof, includes systems and methods that facilitate the automatic creation and deployment of directory services objects and digital certificates for a variety of device types. One such method can include the acts of automatically discovering a device deployed on a network, creating and deploying a corresponding directory services object, automatically creating and deploying a certificate to the device and updating attributes associated with the device. The disclosed system and method lessens the time involved in deploying and configuring directory services and public key infrastructure (PKI) and reduces the chances for errors. The disclosed system and method makes it uniquely easy to adopt best practices and can ensure that object creation and certificate request and installation is handled in the same manner each time.

In another aspect, the disclosure includes systems for the dynamic creation of objects and automated certificate management. One example of a system can include a discovery component, a processing component, a directory services component, a network component, devices, an object component, a certificate component and an output component.

The disclosed system and method automates and streamlines the process of deploying directory services and public key infrastructures (PKI) and reduces manual, error prone administrative activities thereby saving time and costs. The disclosure strengthens security and increases IT efficiency. Resources can be made available in real-time, without waiting for a network administrator to manually configure each device, utilizing the disclosed system and method. The disclosed system and method can also reduce downtime, user wait, configuration errors, security threats and increase productivity and user satisfaction.

To accomplish the foregoing and related ends, certain illustrative aspects of the innovation are described herein in connection with the following description and the annexed drawings. These aspects are indicative, however, of but a few of the various ways in which the principles of the innovation can be employed and the subject innovation is intended to include all such aspects and their equivalents. Other advantages and novel features of the innovation will become apparent from the following detailed description of the innovation when considered in conjunction with the drawings.

DETAILED DESCRIPTION

Figure 1:
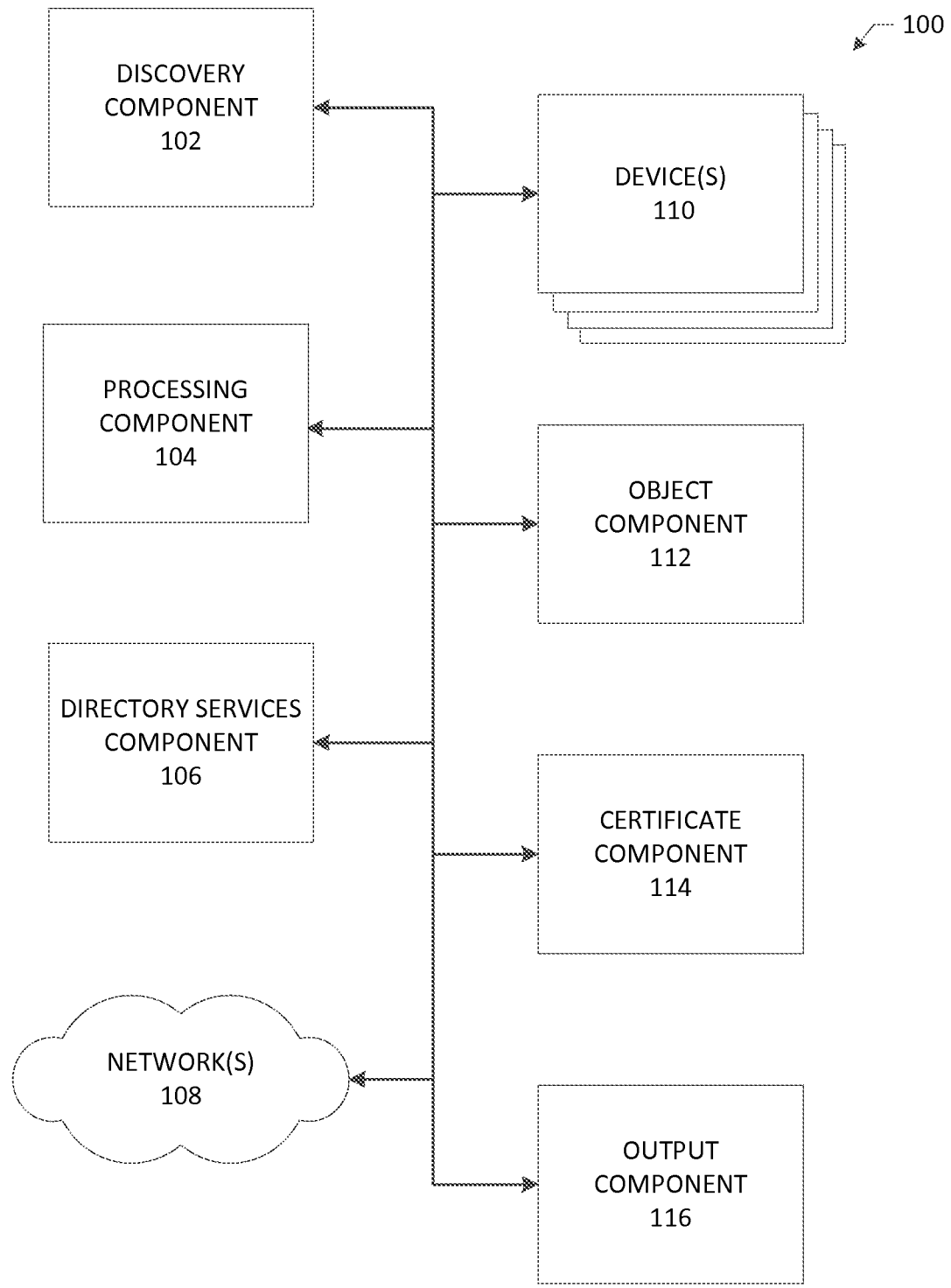
FIG. 1 is an illustration of an example system for object creation and certificate management in accordance with one or more aspects of the disclosure.

The following terms are used throughout the description, the definitions of which are provided herein to assist in understanding various aspects of the disclosure.

For the purposes of this disclosure, the term "directory services" refers to a customizable information store that functions as a point from which users can locate resources and services distributed throughout the network. A directory service may include both a directory storage system and a mechanism that can be used to locate and retrieve information for the system. A directory service can be used to store objects that provide information about items that exist in an organization's network and are associated with one or more domains, such as users, groups of users, computers, applications, services, files and distribution lists. The directory service makes this information available to users and applications throughout the organization. Directory services can include, for example, Microsoft® Active Directory, other directory services for use with a Unix®, Novell® and other network types, and directory services that make use of the Lightweight Directory Access Protocol (LDAP) application protocol for accessing and maintaining distributed directory services over a network.

As used in this disclosure, the term "device" refers to devices, items or elements that may exist in an organization's network, for example, users, groups of users, computer, tablet computer, smart phone, iPad®, iPhone®, wireless access point, wireless client, thin client, applications, services, files, distribution lists, resources, printer, fax machine, copier, scanner, multi-function device, mobile device, badge reader and most any other networked element.

The innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the innovation can be practiced without these specific details. In other instances, well-known structures and devices are shown in block diagram form in order to facilitate describing the innovation.

While specific characteristics are described herein, it is to be understood that the features, functions and benefits of the innovation can employ characteristics that vary from those described herein. These alternatives are to be included within the scope of the innovation and claims appended hereto.

While, for purposes of simplicity of explanation, the one or more methodologies shown herein, e.g., in the form of a flow chart, are shown and described as a series of acts, it is to be understood and appreciated that the subject innovation is not limited by the order of acts, as some acts may, in accordance with the innovation, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation.

As used in this application, the terms "component" and "system" are intended to refer to a computer-related entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

With reference now to the figures, FIG. 1 is an illustration of an example system 100 for dynamic object creation and certificate management according to one or more embodiments. The system 100 can include a discovery component 102, a processing component 104, a directory services component 106, network(s) 108, device(s) 110, an object component 112, a certificate component 114 and an output component 116.

Discovery component 102, can discover new devices 110 and existing devices 110 connected to a network or networks 108. In an embodiment, the discovery component 102 can be configured to continuously scan the network for devices 110. In other embodiments, the discovery component 102 can be configured to scan a network or network at pre-determined time intervals to discover and/or identify network devices 110. Discovery component 102 can also be manually triggered to discover devices 110. For example, a systems administrator or other user can trigger discovery component 102 to scan the network 108 on demand.

In aspects, the discovery component 102 can be configured to discover and/or identify devices 110 for which no directory object exists in a directory service and that do not have a digital certificate. In aspects, the discovery component 102 can discover and/or identify devices 110 for which a directory object exists in the directory services and that do not have a digital certificate. In others aspects, the discovery component 102 can be configured to discover and/or identify a device 110 for which no directory object exists in the directory services and that do have a digital certificate. In further aspects, the discovery component 102 can be configured to discover and/or identify a device 110 for which a directory object exists in the directory services and that have an invalid digital certificate.

The discovery component 102 can communicate device information to the processing component 104 for further processing. For example, the discovery component 102 can communicate device type, location, function and other device specific information to the processing component 104 or other components of system 100.

Processing component 104 can obtain or receive device information from discovery component 102. Processing component 104 can query devices 110 discovered or identified by the discovery component 102 and can exchange device information with the other components of the system 100.

Directory Services component 106 can include both a directory storage system and a mechanism that can be used to locate and retrieve information for the system. Directory services component 106 can be used to store objects that provide information about devices that exist in an organization's network and are associated with one or more domains, such as users, groups of users, computers, applications, services, files and distribution lists. The directory service component 106 makes this information available to users and applications throughout the organization. Directory services component 106 can include, for example, Microsoft® Active Directory, other directory services for use with a Unix®, Novell® and other network types, and directory services that make use of the Lightweight Directory Access Protocol (LDAP) application protocol for accessing and maintaining distributed directory services over a network.

System 100 can include network(s) 108, for example, a local area network, campus area network, wide area network, enterprise private network, intranet, extranet, the Internet or most any other network. The devices and components 110 of system 100 can be connected to and communicate with one another via a network.

Devices 110 can include most any device, item or element in an organization's network, for example, users, groups of users, computer, tablet computer, smart phone, iPad®, iPhone®, wireless access point, wireless client, thin client, applications, services, files, distribution lists, resources, printer, fax machine, copier, scanner, multi-function device, mobile device, badge reader and most any other network element. In an embodiment, devices 110 include devices running the Windows® operating system and devices having non-Windows operating systems.

Object component 112 can receive input from discovery component 102 and processing component 104. Object component 112 can use the information received from discovery component 102, processing component 104, and other components of system 100, to determine whether an object exists within the directory services component 106 for a discovered device 110. If no object exists for the discovered device 110, the object component 112 can create and deploy objects corresponding to the devices 110, discovered on the network 108, for use by the directory service component 106. Each object can represent a single entity, for example, a computer, a user, or a group, and its attributes. An object can be uniquely identified by its name and has a set of attributes. In aspects, object component 112 can utilize printer information, for example, printer type (laser, ink jet etc.), output resolution, manufacturer, printer time of availability and model number to create a printer object for use by the directory service component 106 and to deploy the object to the printer.

In aspects, object component 112 can create a functional active directory object for a device 110. The active directory object can include a unique identifier and a set of attributes defining one or more characteristics, permissions and other setting associated with the object. The object component 112 can identify the type of object to be created based on the discovered device and can specify the object, for example, by specifying the object's class and name and setting object attributes. The object can be deployed by connecting to an appropriate directory services container of directory services component 106 and committing the object to the directory services.

Certificate component 114 can receive device information from processing component 104, and other components of system 100. Certificate component 114 can use the information received from processing component 104, and other components of system 100, to request, generate, deploy and validate digital certificates for use in a public key infrastructure (PKI). A public key infrastructure (PKI) is a system of facilities, policies, and services that supports the use of public key cryptography for authenticating the parties involved in a transaction and that enables an organization to secure its communications and business transactions. The ability of a public key infrastructure (PKI) to secure communications and business transactions is based on the exchange of digital certificates between authenticated users and trusted resources.

Public Key Infrastructure (PKI) Certificates provide the foundation of a public key infrastructure (PKI). A digital certificate is an electronic document that uses a digital signature to bind together a public key with the identity of an individual or device. The system 100 can automatically request, generate, deploy and validate digital certificates for networked devices 110.

In an embodiment, a digital certificate can be an X.509 certificate. A digital certificate can be digital representation of information which (1) identifies the certification authority issuing it, (2) names or identifies its subscriber, (3) contains the subscriber's public key, (4) identifies its operational period, and (5) is digitally signed by the certification authority issuing it.

In an embodiment, the certificate component 114 includes a Certificate Authority. A Certificate Authority issues and manages security credentials. A digital certificate can be obtained by sending information to the Certificate Authority. In an embodiment, generating the certificate includes invoking a remote certificate authority (CA) to generate certificates.

A certificate request can be generated automatically by the system 100. In an aspect, the certificate component 114 can utilize a certificate template to automatically request certificates. The certificate template can be used to define the content and purpose of a digital certificate, including issuance requirements, implemented extensions, such as application policy or extended key usage, and enrollment permissions for certificates. A certificate template can be used to provide the default attributes for a certificate. The certificate component 106 can use device information received or obtained from the discovery component 102, processing component 104, object component 112 and other components along with a certificate template to formulate a certificate request.

Typically, digital signature certificates have an explicit start date and an explicit expiration date. The system 100 can check the validity period of a certificate when the digital certificate is used. The certificate expiration date can be used for managing a certificate revocation list. The certificate revocation list can be issued by the Certificate Authority that has issued the corresponding certificates and can include a list of certificates that have been revoked.

When certificates reach their expiration lifetime, the certificate component 106 can automatically request and create a new certificate, and deploy the certificate to the device 110.

The automatic creation and deployment of certificates can lower costs by eliminating the training, labor, and maintenance expenses associated with traditional certificate management. Automatic certificate management can also serve to simplify and enhance the Administrator and End-User experience by eliminating manual administrator tasks, decreasing errors and reducing wait times.

Output component 116 is capable of receiving input from any of the discovery component 102, processing component 104, directory services component 106, network(s) 108, devices 110, object component 112 and the certificate component 114. The output component 116 can be configured to log or record data, events, operations, warnings, process messages, device changes and system changes associated with the system 100. In accordance with an embodiment, output component 116 is configured to write to a system log. The system log can contain information about device changes, system changes, operations and other events.

Output component 116 can be configured to add, delete, replace or update attributes associated with a device 110 or object. Attributes can include any LDAP or other attributes associated with an object, for example, commonName, domainComponent, givenName, organizationName, owner, surname, userid, userCertificate, macAddress, and the like.

Output component 116 can be configured to provide alerts or notifications to a systems administrator or user. Notifications can include sending information related to the system 100 via, for example, an email, a text message, page, voicemail, video message, multimedia message, social media message, audio communication or visual indicator. In an embodiment, output component 116 can send a text message to the systems administrator including status information associated with object creation, object deployment, certificate creation and certificate deployment. For example, an email or text message can be sent automatically to the systems administrator with information that a certificate deployment has not completed successfully. The notification can inform the systems administrator that manual intervention or other action may be needed. The systems administrator can respond to the notification or alert, which helps to reduce or eliminate difficulties such as delay, downtime, user dissatisfaction and security related problems.

Figure 2:
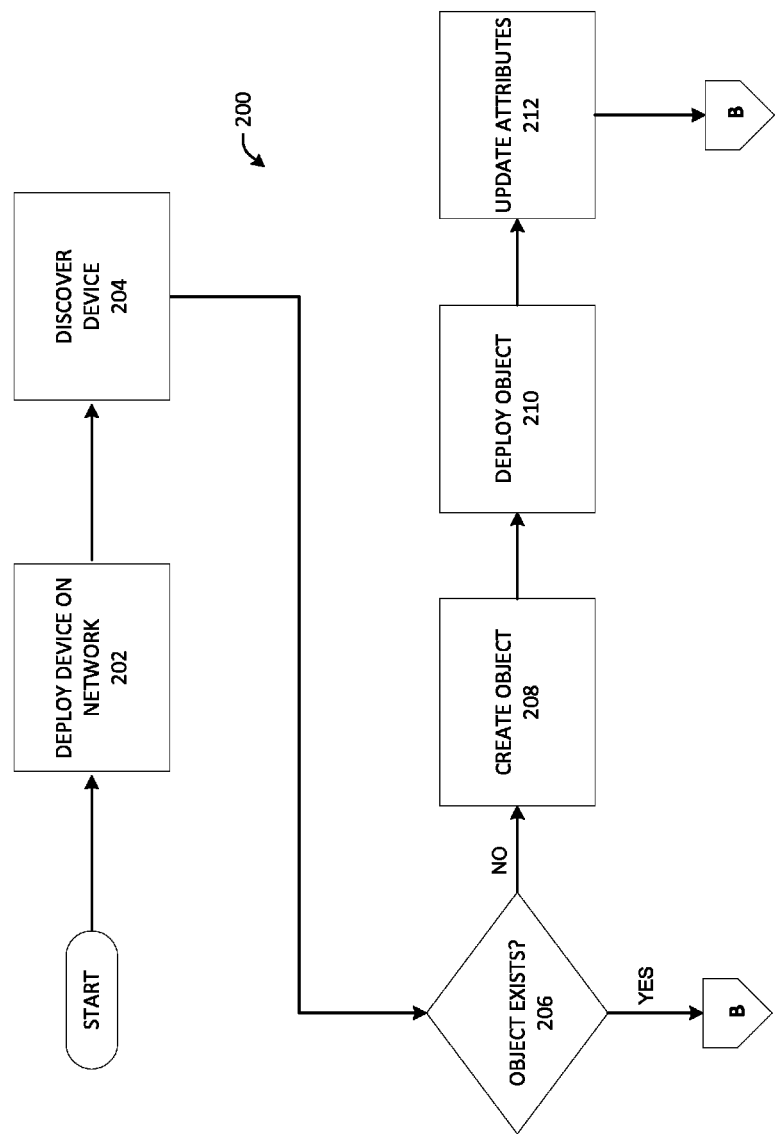
FIG. 2 is an illustration of an example flow chart of a method for object creation and certificate management, according to one or more embodiments.
Figure 3:
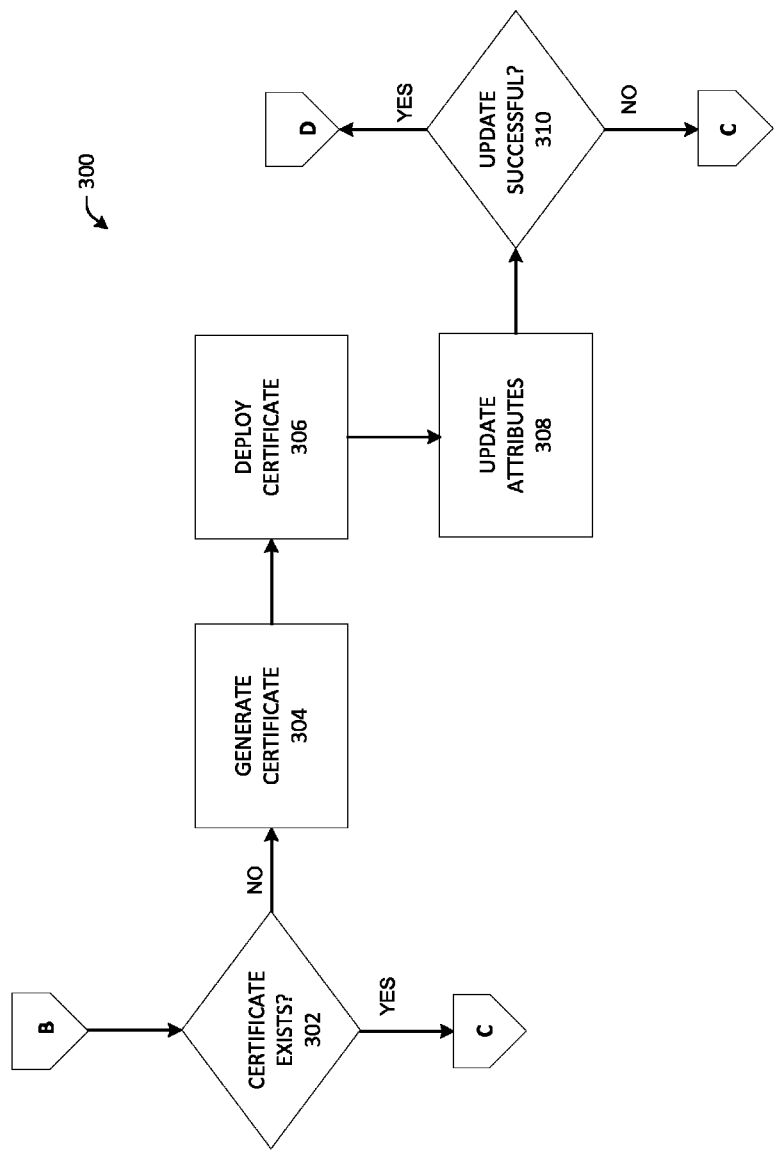
FIG. 3 is an illustration of an example flow chart of a method for object creation and certificate management, according to one or more embodiments.
Figure 4:
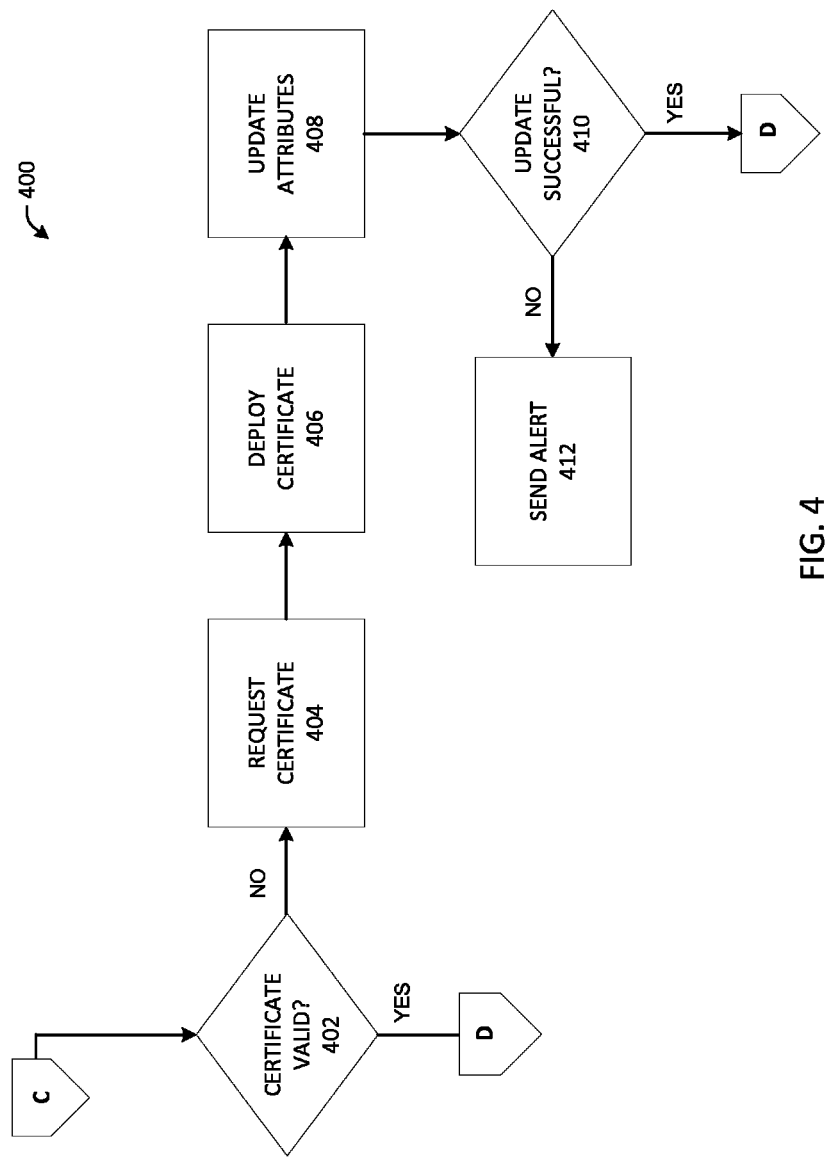
FIG. 4 is an illustration of an example flow chart of a method for object creation and certificate management, according to one or more embodiments.
Figure 5:
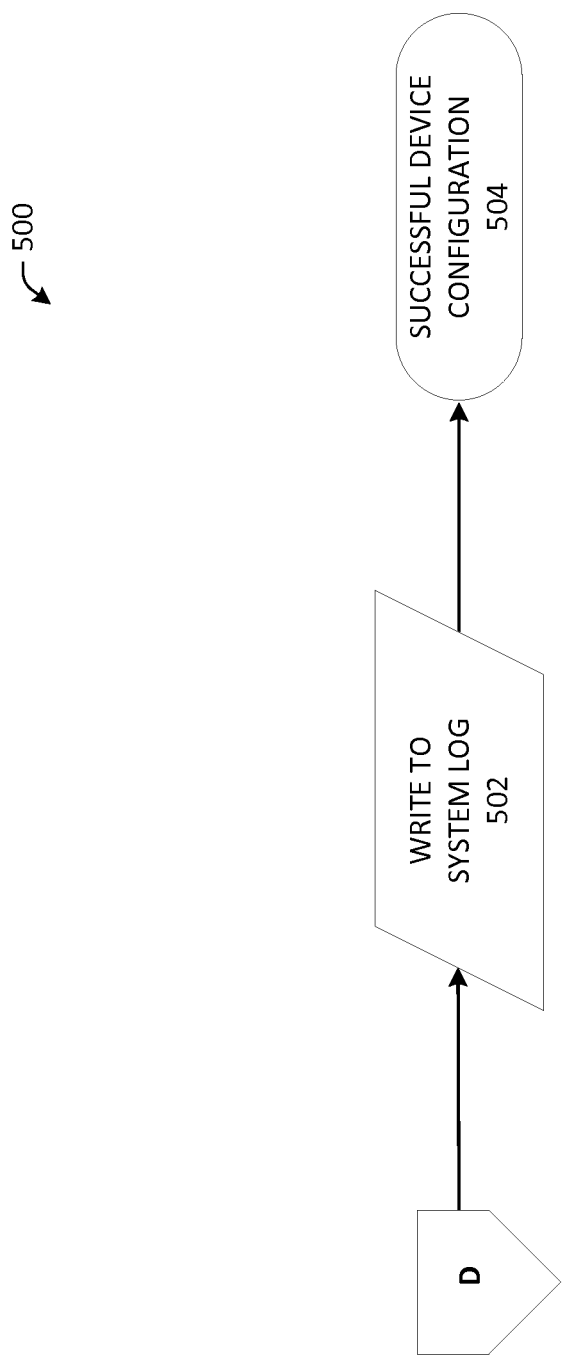
FIG. 5 is an illustration of an example flow chart of a method for object creation and certificate management, according to one or more embodiments.

FIG. 2 illustrates a computer implemented method 300 for dynamic object creation and certificate management in accordance with aspects of the disclosure. Certificate management can include a certificate request, certificate creation, certificate deployment or installation and certificate While, for purposes of simplicity of explanation, the one or more methodologies shown herein, e.g., in the form of a flow chart, are shown and described as a series of acts, it is to be understood and appreciated that the disclosure is not limited by the order of acts, as one or more acts may, in accordance with the disclosure, occur in a different order and/or concurrently with other acts from that shown and described herein. For example, those skilled in the art will understand and appreciate that a methodology could alternatively be represented as a series of interrelated states or events, such as in a state diagram. One or more acts described in connection with an embodiment may be combined with acts described in connection with other embodiments. Moreover, not all illustrated acts may be required to implement a methodology in accordance with the disclosure.

Method 200 can begin at 202 by deploying a device 110 on the network 108. For example, a printer may be connected to the network 108. In accordance with an embodiment, deploying a device 110 on the network 108 can include any of connecting or otherwise joining to the network a computer, workstation, user, user account, resource, printer, fax machine, copier, scanner, multi-function device, mobile device, badge reader, wireless access point, wireless client, thin client, tablet computer, smart phone, iPad® iPhone®, and most any other network entity or element.

At act 204, the device 110 that has been deployed on the network at act 202 is discovered by the system 100. The system 100 can automatically discover-devices 110 on the network 108 using, for example, scheduled network scans, device discovery scripts or in connection with processes associated with the dynamic host configuration protocol (DHCP).

At act 206, the system 100 determines whether an object exists within the directory services component 106 for the discovered device 110. When an object corresponding to the device 110 discovered at act 204 does not exist (206 "NO"), the method 200 proceeds to create an object for the device 208.

At act 208, a directory services object is automatically created for the discovered device by the system 100. In an embodiment, creating the directory services object can include the steps of identifying the type of object to be created based on the discovered device and specifying the object, for example, by specifying the object's class and name and by setting object attributes. The active directory object can include a unique identifier and a set of attributes defining one or more characteristics, permissions and other setting associated with the object.

The method proceeds to act 212 where the object is automatically deployed to the device 110. The object can be deployed by connecting to an appropriate directory services container of directory services component 106 and committing the object to the directory services.

At act 214, attributes associated with the deployed object are updated. In accordance with an embodiment, the characteristics of the deployed object and the type of information the object can hold are updated. In an embodiment, object attributes can be added, deleted, replaced or updated. Attributes can include any LDAP, active directory services attributes, or other attributes associated with an object, for example, commonName, domainComponent, givenName, organizationName, owner, surname, userid, userCertificate, macAddress, and the like.

After act 214, the method 200 proceeds to method 300, connector "B".

When an object corresponding to the device 110 discovered at act 204 exists (206 "YES"), the method 200 proceeds to method 300 (connector "B").

Method 300 (connector "B") begins at act 302 where the system 100 determines whether a certificate exists for the discovered device 110.

If the discovered device 110 does not have a certificate (302 "NO"), a certificate is automatically created at act 304 by the system 100. In an embodiment, certificate creation 304 can include the steps of receiving object identifying information and object attributes, and requesting a digital certificate from the appropriate Certificate Authority.

A certificate template can be used to provide default attributes for the certificate request. The system 100 can request, create, deploy and validate a digital certificate for use in a public key infrastructure (PKI).

The contents of the certificate can include information such as the owner of the certificate, the serial number, the signer or issuer of the certificate, the validity period (the starting and ending dates when the certificate is considered valid), the hashing algorithm used and extensions.

Once the certificate has been created, the method proceeds to act 306 where the certificate is automatically deployed to the device 110. In an embodiment, a certificate file is imported to the device 110 and saved to the appropriate certificate store based on the type of certificate.

At act 308, attributes associated with the certificate, device, installation or the certificate deployment are updated.

At 310, the method verifies that the attribute update was successful. When the attribute update is unsuccessful 310 ("NO"), the method 300 proceeds to method 400, connector "C".

When the attribute update is successful 310 ("YES"), the method 300 proceeds to method 500, connector "D".

Method 400 (connector "C") begins at act 402 where the system 100 determines whether the certificate is valid. In an embodiment, the certificate validity period is evaluated. For added security, a digital certificate has an expiration date that is enforced by the certification authority. In aspects, a digital certificate can expire one year from the time it was issued. The reason for doing this is to greatly reduce the possibility that a malicious individual could derive a signature's private key from its public key. While deriving a private key from a public key is extremely unlikely because of the vast number of possible combinations that would need to be calculated for large key values, it is still not theoretically impossible. Additionally, adding an expiration date limits the lifetime of the certificate in the event that it is stolen. The certificate's expiration date ensures that any signature made after a certificate expires is invalid.

While all expired certificates are invalid, not all unexpired certificates are valid. At act 402, the certificate may be invalid under other circumstances, for example, the certificate has been issued by an unknown authority or has been revoked.

When it has been determined that certificate is not valid (e.g. the certificate validity period has expired), a certificate is requested 404. Similar to act 304 of method 300, certificate creation 304 can include the steps of receiving object identifying information and object attributes, and requesting a digital certificate from the appropriate Certificate Authority.

The certificate is deployed or installed 406 to the device 110. Similar to act 306 of method 300, act 406 can include the steps importing a certificate file to the device 110 and saving the certificate to the appropriate certificate store based on the type of certificate.

At act 408, object attributes associated with the certificate, device, installation or deployment are updated.

At 410, the method 400 verifies that the attribute update was successful. When the attribute update is unsuccessful 410 ("NO"), the method 400 proceeds to act 412 where a notification is sent. In an embodiment, an alert or notification is sent to the systems administrator. The alert or notification can include information related to the device, object, certificate, or other system information. The notification can include, for example, an email, a text message, page, voicemail, video message, multimedia message, social media message, audio communication or visual indicator. In an embodiment, at act 412 a text message can be sent to the systems administrator including status information associated with certificate creation and certificate deployment.

When the attribute update is successful 410 ("YES"), the method 400 proceeds to method 500, connector "D".

Method 500 (connector "D") begins at act 502 where details are written to the system log. Information written to the system log can include information about device changes, system changes, operations and other events.

The method 500 concludes at act 504 where the configuration is successful. A directory services object has been created and installed for the discovered device, a certificate has been created, installed and validated, and details have been written to the systems log.

The disclosed system and method for dynamic directory object creation and certificate management can help improve compliance with security policies by minimizing the human factor and ensure the integrity and consistency of Active Directory data. The disclosed system and method can help avoid mistakes due to the repetitive nature of manual configuration. The disclosed system and method are effective for most any device or network entity, including, for example, Windows® based device as well as non-Windows based devices. The system and method provide improved network availability, increased productivity and efficiency and, reduced mean time to resolution (as measured by the average elapsed time from when a network incident is reported until the incident is resolved).

Figure 6:
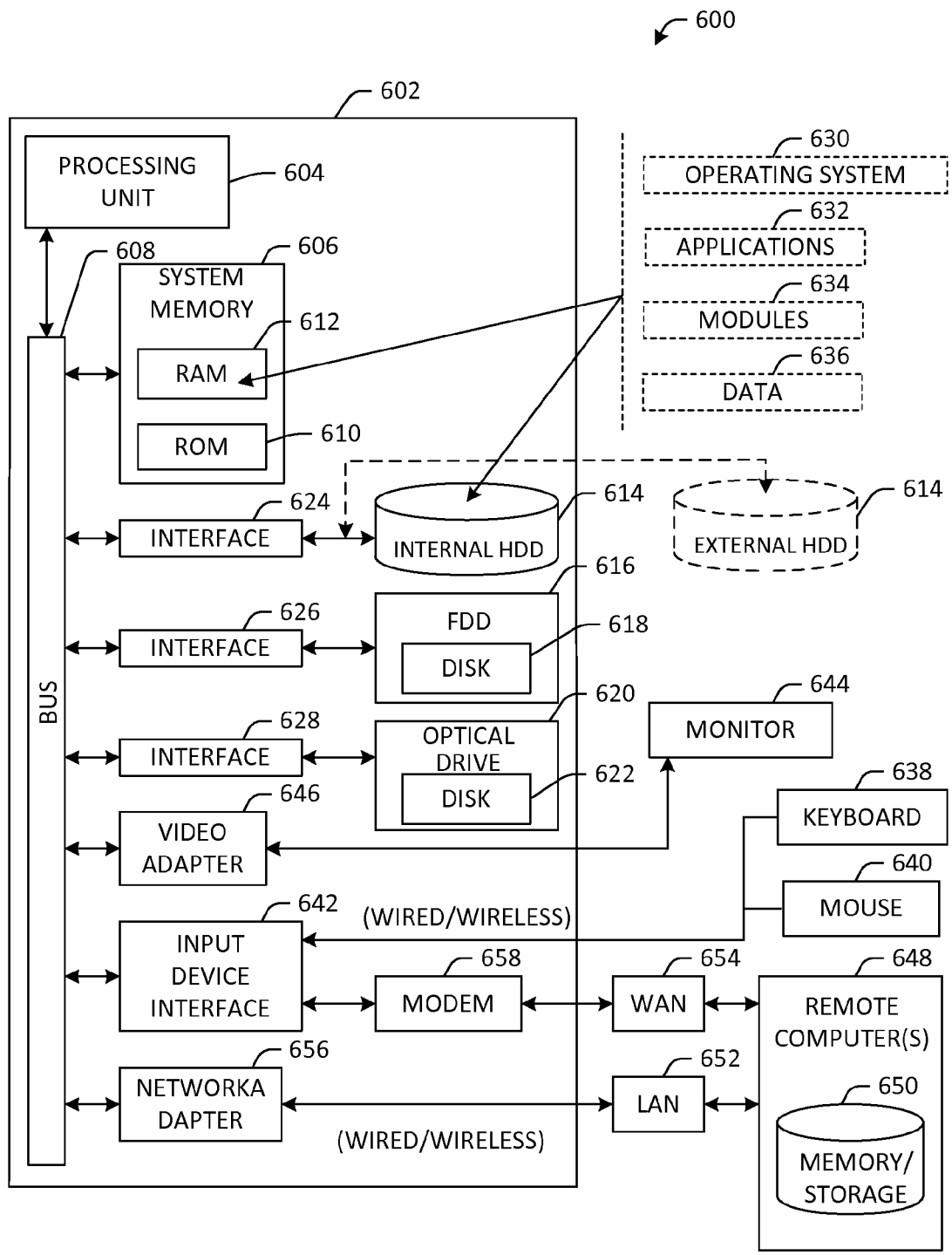
FIG. 6 is an illustration of an example computing environment where one or more of the provisions set forth herein are implemented, according to one or more embodiments.

Referring now to FIG. 6, there is illustrated a block diagram of a computer operable to execute the disclosed architecture. In order to provide additional context for various aspects of the subject innovation, FIG. 6 and the following discussion are intended to provide a brief, general description of a suitable computing environment 600 in which the various aspects of the innovation can be implemented. While the innovation has been described above in the general context of computer-executable instructions that may run on one or more computers, those skilled in the art will recognize that the innovation also can be implemented in combination with other program modules or components and/or as a combination of hardware and software.

Generally, program modules include routines, programs, components, data structures, etc., that perform particular tasks or implement particular abstract data types. Moreover, the inventive methods can be practiced with other computer system configurations, including single-processor or multi-processor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 6, the exemplary environment 600 for implementing various aspects of the innovation includes a computer 602, the computer 602 including a processing unit 604, a system memory 606 and a system bus 608. The system bus 608 couples system components including, but not limited to, the system memory 606 to the processing unit 604. The processing unit 604 can be any of various commercially available processors. Dual microprocessors and other multi-processor architectures may also be employed as the processing unit 604.

The system bus 608 can be any of several types of bus structure that may further interconnect to a memory bus (with or without a memory controller), a peripheral bus, and a local bus using any of a variety of commercially available bus architectures. The system memory 606 includes read-only memory (ROM) 610 and random access memory (RAM) 612. A basic input/output system (BIOS) is stored in a non-volatile memory 610 such as ROM, EPROM, EEPROM, which BIOS contains the basic routines that help to transfer information between elements within the computer 602, such as during start-up. The RAM 612 can also include a high-speed RAM such as static RAM for caching data.

The computer 602 further includes an internal hard disk drive (HDD) 614 (e.g., EIDE, SATA), which internal hard disk drive 614 may also be configured for external use in a suitable chassis (not shown), a magnetic floppy disk drive (FDD) 616, (e.g., to read from or write to a removable diskette 618) and an optical disk drive 620, (e.g., reading a CD-ROM disk 622 or, to read from or write to other high capacity optical media such as the DVD). The hard disk drive 614, magnetic disk drive 616 and optical disk drive 620 can be connected to the system bus 608 by a hard disk drive interface 624, a magnetic disk drive interface 626 and an optical drive interface 628, respectively. The interface 624 for external drive implementations includes at least one or both of Universal Serial Bus (USB) and IEEE 1394 interface technologies. Other external drive connection technologies are within contemplation of the subject innovation.

The drives and their associated computer-readable media provide nonvolatile storage of data, data structures, computer-executable instructions, and so forth. For the computer 602, the drives and media accommodate the storage of any data in a suitable digital format. Although the description of computer-readable media above refers to a HDD, a removable magnetic diskette, and a removable optical media such as a CD or DVD, other types of media which are readable by a computer, such as zip drives, magnetic cassettes, flash memory cards, cartridges, and the like, may also be used in the exemplary operating environment, and further, that any such media may contain computer-executable instructions for performing the methods of the innovation.

A number of program modules can be stored in the drives and RAM 612, including an operating system 630, one or more application programs 632, other program modules 634 and program data 636. All or portions of the operating system, applications, modules, and/or data can also be cached in the RAM 612. The innovation can be implemented with various commercially available operating systems or combinations of operating systems.

A user can enter commands and information into the computer 602 through one or more wired/wireless input devices, e.g., a keyboard 638 and a pointing device, such as a mouse 640. Other input devices (not shown) may include a microphone, an IR remote control, a joystick, a game pad, a stylus pen, touch screen, or the like. These and other input devices are often connected to the processing unit 604 through an input device interface 642 that is coupled to the system bus 608, but can be connected by other interfaces, such as a parallel port, an IEEE 1394 serial port, a game port, a USB port, an IR interface, etc.

A monitor 644 or other type of display device is also connected to the system bus 608 via an interface, such as a video adapter 646. In addition to the monitor 644, a computer typically includes other peripheral output devices (not shown), such as speakers, printers, etc.

The computer 602 may operate in a networked environment using logical connections via wired and/or wireless communications to one or more remote computers, such as a remote computer(s) 648. The remote computer(s) 648 can be a workstation, a server computer, a router, a personal computer, portable computer, microprocessor-based entertainment appliance, a peer device or other common network node, and typically includes many or all of the elements described relative to the computer 602, although, for purposes of brevity, only a memory/storage device 650 is illustrated. The logical connections depicted include wired/wireless connectivity to a local area network (LAN) 652 and/or larger networks, e.g., a wide area network (WAN) 654. Such LAN and WAN networking environments are commonplace in offices and companies, and facilitate enterprise-wide computer networks, such as intranets, all of which may connect to a global communications network, e.g., the Internet.

When used in a LAN networking environment, the computer 602 is connected to the local network 652 through a wired and/or wireless communication network interface or adapter 656. The adapter 656 may facilitate wired or wireless communication to the LAN 652, which may also include a wireless access point disposed thereon for communicating with the wireless adapter 656.

When used in a WAN networking environment, the computer 602 can include a modem 658, or is connected to a communications server on the WAN 654, or has other means for establishing communications over the WAN 654, such as by way of the Internet. The modem 658, which can be internal or external and a wired or wireless device, is connected to the system bus 608 via the serial port interface 642. In a networked environment, program modules or components depicted relative to the computer 602, or portions thereof, can be stored in the remote memory/storage device 650. The network connections shown are exemplary and other means of establishing a communications link between the computers can be used.

The computer 602 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to wired Ethernet networks used in many offices.

Figure 7:
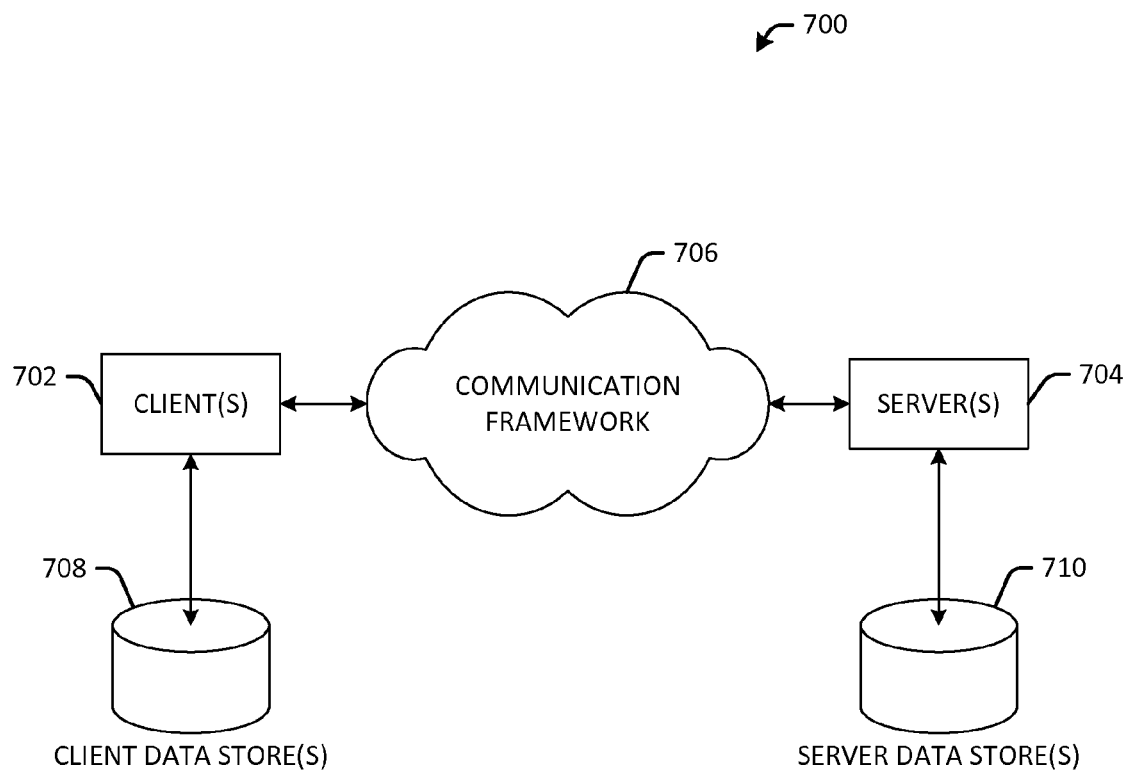
FIG. 7 is an illustration of an example computing environment where one or more of the provisions set forth herein are implemented, according to one or more embodiments.

Referring now to FIG. 7, there is illustrated a schematic block diagram of an exemplary computing environment 700 in accordance with the subject innovation. The system 700 includes one or more client(s) 702. The client(s) 702 can be hardware and/or software (e.g., threads, processes, computing devices).

The system 700 also includes one or more server(s) 704. The server(s) 704 can also be hardware and/or software (e.g., threads, processes, computing devices). The servers 704 can house threads to perform transformations by employing the innovation, for example. One possible communication between a client 702 and a server 704 can be in the form of a data packet adapted to be transmitted between two or more computer processes. The system 700 includes a communication framework 706 (e.g., a global communication network such as the Internet) that can be employed to facilitate communications between the client(s) 702 and the server(s) 704.

Communications can be facilitated via a wired (including optical fiber) and/or wireless technology. The client(s) 702 are operatively connected to one or more client data store(s) 708 that can be employed to store information local to the client(s) 702. Similarly, the server(s) 704 are operatively connected to one or more server data store(s) 710 that can be employed to store information local to the servers 704.

What has been described above includes examples of the innovation. It is, of course, not possible to describe every conceivable combination of components or methodologies for purposes of describing the subject innovation, but one of ordinary skill in the art may recognize that many further combinations and permutations of the innovation are possible. Accordingly, the innovation is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A system for dynamic object creation and certificate management, comprising:

a discovery component configured to discover at least one device communicatively coupled to a network;

a processing component configured to receive device information associated with the device from the discovery component;

an object component configured to create a directory services object having a unique identifier and a set of attributes each corresponding to the device, wherein the directory services object is based on the device information;

a certificate component configured to:
  i. generate a digital certificate for the device based on the device information provided by the directory services object and the set of attributes, and
  ii. install the digital certificate on the device; and an output component configured to update the directory services object with updated attributes associated with the device, wherein the updated directory services object is verified for the updated attributes, and wherein the attributes include at least one of LDAP, active directory services attributes, commonName, domainComponent, givenName, organizationName, owner, surname, userid, userCertificate, or macAddress.

2. The system for object creation and certificate management of claim 1, wherein the object component is configured to create a directory service object for the device when there is no directory service object associated with the device.

3. The system for object creation and certificate management of claim 1, wherein the certificate component is configured to generate the digital certificate for the device when the device information indicates that the device has a non-existent, expired, revoked or invalid certificate.

4. The system for object creation and certificate management of claim 1, wherein the output component is configured to generate a notification including information related to at least one of object creation, object deployment, certificate creation, certificate installation or attribute updates.

5. The object creation and certificate management system of claim 4, wherein the notification comprises at least one of an email, a page, a text message, a voicemail, a video message, a multimedia message, a social media message, a system log message, an audio communication or a visual indicator.

6. The system for object creation and certificate management of claim 1, wherein the device comprises a user, groups of users, computer, smart phone, wireless access point, wireless client, printer, fax machine, copier, scanner, multi-function device, mobile device or badge reader.

7. The system for object creation and certificate management of claim 1, wherein the digital certificate comprises an X.509 digital certificate for use in a public key infrastructure (PKI).

8. A computer implemented method for object creation and certificate management, comprising:
  utilizing one or more processors and memory storing one or more programs for execution by the one or more processors, the one or more programs including instructions for:
  discovering at least one device connected to a network;
  receiving information associated with the device;
  creating a directory service object having attributes corresponding to the device based on the information;
  deploying the directory service object to the device;
  validating a first digital certificate associated with the device;
  generating a second digital certificate based on the first digital certificate validation, the directory service object, and the attributes;
  installing the second digital certificate on the device;
  updating the attributes associated with the directory service object and the second digital certificate, wherein the attributes include at least one of LDAP, active directory services attributes, commonName, domainComponent, givenName, organizationName, owner, surname, userid, userCertificate, or macAddress; and
  verifying the updated directory services object for the updated attributes.

9. The computer implemented method for object creation and certificate management of claim 8, including generating a notification that includes information related to directory service object creation, directory service object deployment, digital certificate creation, or digital certificate installation.

10. The computer implemented method for object creation and certificate management of claim 9, wherein generating a notification comprises generating at least one of an email, a page, a text message, voicemail, video message, multimedia message, social media message, system log message, audio communication or visual indicator.

11. The computer implemented method for object creation and certificate management of claim 8, comprising determining whether a directory service object exists for the device based on the information associated with the device and information associated with a directory service.

12. The computer implemented method for object creation and certificate management of claim 8, wherein validating a digital certificate includes determining whether the digital certificate is valid, non-existent, expired, revoked or invalid.

13. The computer implemented method for object creation and certificate management of claim 12, wherein generating a digital certificate comprises generating a digital certificate when the digital certificate validation indicates one of non-existent, expired, revoked or invalid.

14. The computer implemented method for object creation and certificate management of claim 8, wherein the directory service object comprises a unique identifier and a set of attributes.

15. The computer implemented method for object creation and certificate management of claim 8, wherein the digital certificate comprises an X.509 digital certificate for use in a public key infrastructure (PKI).

16. A computer implemented method for object creation and certificate management, comprising:
  utilizing one or more processors and memory storing one or more programs for execution by the one or more processors, the one or more programs including instructions for:
  discovering at least one device connected to a network;
  receiving information associated with the device;
  creating an active directory service object having attributes corresponding to the device based on the information;
  deploying the active directory service object to the device;
  validating a first X.509 digital certificate associated with the device;
  generating a second X.509 digital certificate when the digital certificate validation indicates that the first X.509 certificate is non-existent, invalid, expired or revoked, and based on the active directory service object and the attributes;
  installing the second X.509 digital certificate on the device;
  updating the attributes associated with the active directory service object and the second X.509 digital certificate;
  wherein the attributes include at least one of LDAP, active directory services attributes, commonName, domainComponent, givenName, organizationName, owner, surname, userid, userCertificate, or macAddress; and verifying the updated attributes of the active directory service object and the X.509 digital certificate.

17. The computer implemented method for object creation and certificate management of claim 16, including generating a notification that includes information related to active directory object creation, active directory object deployment, X.509 digital certificate creation, or X.509 digital certificate installation.

* * * * *